United States Patent [19]

Murphy et al.

[11] 4,283,317

[45] Aug. 11, 1981

[54] WAX-FREE, HOT MELT ADHESIVE COMPOSITIONS

[75] Inventors: Charles V. Murphy, Wilmington, Del.; Robert J. Statz, Kennett Square, Pa.

[73] Assignee: E. I. Du Pont de Nemours and Company, Wilmington, Del.

[21] Appl. No.: 187,173

[22] Filed: Sep. 15, 1980

[51] Int. Cl.³ .................... C08L 93/04; C08K 5/13; C08K 5/52
[52] U.S. Cl. .................... 260/27 R; 156/327; 156/334; 260/33.6 R; 260/45.7 PH; 260/45.95 H
[58] Field of Search .............. 260/27 R; 156/327, 334

[56] References Cited

U.S. PATENT DOCUMENTS

| | | | |
|---|---|---|---|
| 3,201,374 | 8/1965 | Simms | 260/80.5 |
| 3,264,272 | 8/1966 | Rees | 260/78.5 |
| 3,635,861 | 1/1972 | Russell | 260/27 R |
| 3,775,146 | 11/1973 | Reckziegel et al. | 106/218 |
| 3,838,079 | 9/1974 | Kosaka et al. | 260/27 R |
| 3,860,543 | 1/1975 | Masuda et al. | 260/28.5 A X |
| 3,862,068 | 1/1975 | Russell | 260/27 R |
| 3,884,882 | 5/1975 | Caywood | 525/332 |
| 3,932,341 | 1/1976 | Kutch et al. | 260/33.6 |
| 4,140,733 | 2/1979 | Meyer et al. | 260/27 R |
| 4,207,220 | 6/1980 | Godfrey | 260/27 R |

*Primary Examiner*—H. S. Cockeram

[57] ABSTRACT

Wax-free hot melt adhesive compositions based on a copolymer of an α-olefin, especially ethylene, with an unsaturated carboxylic acid, especially an α,β-unsaturated carboxylic acid, or with maleic anhydride and optionally also with another unsaturated carboxylic acid or ester; a tall oil rosin; and a hydrocarbon oil provide good quality bonds. When the level of oil is less than 15%, particularly up to about 13%, there is no oil exudation. The hot melt adhesive compositions of this invention have a good melt viscosity stability when an antioxidant, especially a hindered phenol or organic phosphite, is added. These compositions are useful for heat sealing cartons and for similar applications. Formulations containing tall oil rosins and processing oils approved by the Food and Drug Administration can be readily prepared.

13 Claims, No Drawings

WAX-FREE, HOT MELT ADHESIVE COMPOSITIONS

BACKGROUND OF THE INVENTION

This invention is directed to low cost, wax-free, hot melt adhesive compositions particularly suitable for such applications as, for example, sealing packaging cartons.

The usual commercial hot melt adhesives are based on a solid, polymeric thermoplastic material, which is compounded with one or more tackifiers and waxes and contains additives such as antioxidants or other stabilizers. The most commonly used tackifiers are hydrocarbon resins, terpenes, terpene/phenolics, coumarone/indene resins, polymerized $\alpha$- and $\beta$-pinenes, rosin-modified phenolic resins, polymerized rosin, rosin derivatives such as hydrogenated and dimerized rosins, and tall oil rosins. Because of their higher heat sensitivity, tall oil rosins are not normally recommended for use in high quality hot melt adhesive compositions. Wax, which is a low-melting hydrocarbon material, serves as a softening point depressant and the same time as a low cost filler. The usual waxes employed in hot melt adhesive compositions include paraffin waxes, microcrystalline waxes, and synthetic waxes. A hot melt adhesive composition naturally must be heat stable. Decomposition of any component on heating or exudation at any temperature would make such a composition useless. Similarly, crystallization of the adhesive on cooling would be very undesirable. While many high performance, high cost hot melt adhesives are commercially available, it has been difficult to formulate a low cost hot melt adhesive composition capable of providing high strength bonds. For example, a low cost adhesive might use cheap processing oils instead of expensive waxes, but oils have not met with good acceptance because of their tendency to exude.

SUMMARY OF THE INVENTION

According to the present invention, there is provided a wax-free adhesive composition having an initial 350° F. (177° C.) melt viscosity of about 1000–4000 kPa·s and consisting essentially of the following components:

(1) about 20–50 parts of a copolymer of a $C_2$–$C_{10}$ $\alpha$-olefin with an aliphatic, ethylenically unsaturated carboxylic acid or with maleic anhydride, which copolymer may also contain another ethylenically unsaturated comonomer selected from the group consisting of carboxylic acids and carboxylic acid esters;

(2) about 30–60 parts of a tall oil rosin; and (3) about 1–13 parts of a hydrocarbon oil;

all the above parts being by weight, and their sum being 100; said adhesive composition also containing a minor amount of an antioxidant capable of stabilizing it against viscosity deterioration and substantial discoloration on heating.

DETAILED DESCRIPTION OF THE INVENTION

In addition to the low cost requirement, the adhesive compositions of the present invention must possess acceptable physical properties. Beside the required melt viscosity range recited in the Summary of the Invention, satisfactory hot melt adhesive compositions should have an acceptable softening point, good tensile strength and elastic modulus, sufficient elongation, and good adhesive properties.

The desirable properties of such compositions are as follows:

| | |
|---|---|
| Softening point | about 93 ± 9° C. |
| Tensile strength | 2400–5500 kPa |
| Elongation | minimum 60% |
| Elastic modulus | minimum 34.5 MPa |
| Lap shear adhesion fail temperature | minimum 71° C. |
| T-Peel at −28.9° C. | no adhesive failure |
| Cold creep | more than 8 hours to adhesive failure |

The principal component of the hot melt adhesives of the present invention is the base copolymer, Component (1). The $\alpha$-olefin normally will be ethylene, although other $\alpha$-olefins or mixtures of ethylene with other $\alpha$-olefins may be used. Normally the proportion of the other olefin in the monomer mixture will be less than the proportion of ethylene, in practice no more than about 20% of the total $\alpha$-olefin makeup. The preferred $\alpha$-olefin other than ethylene is propylene. Other suitable olefins include, for example, 1-butene, 1-hexene, 1-octene, and 1-decene. Suitable ethylenically unsaturated carboxylic acids may be either $\alpha,\beta$-unsaturated or unsaturated at a position farther removed from the carboxylic group, especially in a terminal position. Suitable $\alpha,\beta$-unsaturated carboxylic acids include itaconic acid and acids having the following formula

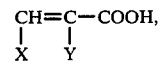

where X is H, COOH, or COOR, R being a hydrocarbon radical; and Y is H or $CH_3$.

Other types of unsaturated carboxylic acids include, for example, 3,4-butenoic acid, 7,8-heptenoic acid, and undecylenic acid.

Unsaturated carboxylic acids can be copolymerized with $\alpha$-olefins in a well-known manner in the presence of free radical generators, as described, for example, in U.S. Pat. No. 3,264,272 to Rees, which is herein incorporated by reference. Maleic anhydride can be grafted on $\alpha$-olefin polymers and copolymers in a free radical-initiated reaction, as also explained in the above patent, or may be grafted without any free radical generators on $\alpha$-olefin polymers having residual unsaturation (for example, EPDM copolymers), as described in U.S. Pat. No. 3,884,882 to Caywood. Contrary to the teachings of U.S. Pat. No. 3,264,272, the acid groups should not be for the purpose of this invention converted to the ionic form. Copolymers of an $\alpha$-olefin with an unsaturated comonomer and carboxylic acid can be made, for example, as taught in U.S. Pat. No. 3,201,374 to Simms. In addition to copolymers of $\alpha$-olefin with an unsaturated ester and a carboxylic acid, such copolymers may be copolymers of an $\alpha$-olefin with two different carboxylic acids, especially $\alpha,\beta$-unsaturated carboxylic acids. The unsaturated ester may be either a vinyl ester of a saturated carboxylic acid or an ester of a saturated alcohol and an unsaturated carboxylic acid. Representative of the former group are vinyl acetate, vinyl propionate, and vinyl isobutyrate; while those esters representative of the latter group are methyl acrylate, methyl methacrylate, dimethyl maleate, monoethyl fumarate, and mono- or diethyl itaconate.

The preferred proportion of α-olefin in the copolymers used in the present adhesive compositions is 80-99% by weight, preferably 85-95%, and particularly 90-95%. When these proportions are maintained, the adhesive compositions have good rheological and adhesive properties.

The preferred adhesive compositions contain about 30-50 parts of the base polymer, 45-60 parts of tall oil rosin, and 3-7 parts of hydrocarbon oil. At a level of about 15 parts some oil exudation is observed at ambient temperature. Hydrocarbon oils suitable in the instant adhesive compositions are the usual processing oils which are commercially available from a number of suppliers, for example Sun Petroleum Products Co., Exxon Corporation, and Shell Chemical Co. The oils may or may not contain aromatic hydrocarbons in addition to predominant aliphatic and naphthenic hydrocarbons.

The tall oil rosins used in the adhesive compositions of the present invention are inexpensive rosins obtained as a by-product from black liquor soap in paper manufacturing. Tall oil rosins consist mainly of rosin acids (about 88-92%) plus 4-6% of rosin esters and anhydrides, 2-5% of unsaponifiable matter, and 1-3% of fatty acids. A typical rosin acid composition of one commercial unmodified tall oil rosin is as follows:

| Abietic acid | 34% |
|---|---|
| Dehydroabietic acid | 24% |
| Palestric acid | 9% |
| Dihydroabietic acid | 5% |
| Neoabietic acid | 3% |
| Isopimaric acid | 6% |
| Pimaric acid | 5% | the remainder being unsaponifiable matter and fatty acids.

For the purpose of this invention, it is preferred to use modified tall oil rosins. Typical treatment methods which reduce the rosin's tendency to crystallize are: heat treatment, partial neutralization with sodium hydroxide, and polymerization. The oxidation resistance of these rosins can be improved by disproportionation, hydrogenation, maleation, and, to a lesser extent, polymerization. Heat treatment, which causes disproportionation of abietic acid into dehydroabietic acid and tetrahydroabietic acid, results in significant stabilization. Heat treated tall oil rosin is the preferred tackifying resin in the compositions of the present invention. While other methods of stabilizing tall oil rosins may provide equal results, those other methods are more expensive and would unnecessarily increase the cost of the adhesive composition.

The adhesive compositions of the present invention should be stabilized against undesirable viscosity changes and discoloration under heat conditions. The viscosity normally increases on prolonged heating, and the industry prefers melt adhesive compositions which can withstand a 177° C. temperature for 100 hours without a viscosity change of more than about 20%. It is, however, recognized that the normal case sealing or similar bonding operations are carried out with adhesive tanks of limited capacity, which are emptied in the course of at most a few hours of work. Accordingly, such stringent stability standards may not always be necessary, and many compositions which have a satisfactory initial stability would be quite satisfactory for a majority of sealing operations. While dark color is not necessarily indicative of decomposition or poor quality, many hot melt adhesive users tend to associate dark color with degradation and find dark adhesive melts to be undesirable. Although many commercial antioxidants are used as stabilizers for a variety of polymeric materials, including hindered phenols, amines, and organophosphorus compounds, amines are not considered desirable in the compositions of the present invention because of their tendency to develop dark color on heating. Organophosphorus compounds by themselves are more efficient than hindered phenols by themselves, but one of the best antioxidant combinations seems to be a mixture of equal weights of two commercial antioxidants: Irganox ® 1010 (Ciba-Geigy Corp.) and Weston ® 618 (Borg-Warner Co.). The former is a hindered phenol—tetrakis[methylene 3-(3'-di-tert-butyl-4'-hydroxyphenyl) propionate] methane—while the latter is an organic phosphite ester—di(octadecylpentaerithritol) diphosphite. Another particularly effective antioxidant is Weston ® TNPP, tris(nonlyphenyl) phosphite. A properly stabilized adhesive composition of this invention is light yellow and becomes dark yellow on heating to its melting temperature. The amount of antioxidant is less than 1% of the weight of the other components and may be as little as 0.1% or less. The hot melt adhesive compositions of the present invention provide good bonding of a variety of surfaces, for example, paper, cardboard, natural and synthetic fibers, plastics and elastomers, metals, and wood.

This invention is now illustrated by the following examples of certain preferred embodiments thereof, where all parts, proportions, and percentages are by weight, unless otherwise indicated.

Testing was done as described below.

Oil exudation was observed visually at ambient temperature.

Melt viscosity was measured using a Brookfield RVT Viscometer the thermocel system complete with Model 63A controller using a No. SC4-27 spindle.

Melt viscosity stability was determined by obtaining an initial viscosity reading at 177° C. and then maintaining the adhesive at 177° C. in a controlled forced air oven for 100 hours. Viscosity was then measured at 177° C. using the above Brookfield RVT Viscometer and thermocel system.

Softening point was determined by ring and ball apparatus, ASTM Designation D36-70.

Tensile strength, elongation and modulus of elasticity were obtained according to ANSI/ASTM D-638-77a.

Adhesive Application Procedures (a) The test adhesive was applied as a coating to "60-80 lb" kraft paper with a 15 cm laboratory hot melt coater. The coated paper was heat-sealed, coated side to coated side using a Sentinel heat sealer model 12ASL at designated temperatures, pressures and dwell times. The bond can be either a lap shear or a T-peel type.

(b) A hot melt adhesive gun (Hot Shot Gun, Model No. 200HS, Adhesive Machinery Corporation) was used to apply an approximate 3 mm adhesive bead to a boxboard substrate. The adhesive bead is applied at 177° C. and immediately covered with an equivalent sized piece of boxboard using light hand pressure.

Lap Shear Adhesion Tests—High Temperature (a) Programmed oven—a lap-shear specimen 2.5 cm in width is attached to a clamp inside a forced air oven. A 454 g weight is attached via a clamp to the bottom of the specimen. The oven is programmed to increase in temperature at a rate of 10° C./hour. The timer is started and when the specimen bond is completely broken, the weight falls and trips (stops) the timer. The fail temperature is calculated based on the initial oven temperature at the start of the test plus the time/temperature increase till bond failure.

(b) 24-hour test at designated temperature—a lap shear test specimen is tested in the same manner as in the programmed oven test with a 454 g weight attached. The oven is kept at a constant temperature for a 24 hour period. If the bond does not fail after 24 hours, the temperature is raised 5.55° C. and a new specimen is tested for 24 hours.

T-peel Adhesion Test—Low Temperature (−28.9° C. or −32° C.)

A T-peel specimen 2.54 cm in width is placed in a cold box for 24 hours. The test specimen is pulled apart inside the cold box and observed for type of bond failure (e.g., fiber tear, adhesive failure, cohesive failure).

Room Temperature Creep Properties

A T-peel specimen 2.54 cm in width is attached to a clamp and a 454 g weight is attached via a clamp to the bottom of the specimen. The test is conducted under ambient conditions, and the time to complete bond failure is recorded.

In all cases, the compositions were stabilized by the addition of 0.01%, based on all the components, of 2,6-di-tert-butyl-4-methylphenol.

The results of all the tests were obtained in British units and then converted to SI units. Temperatures in °F. were converted to °C.

EXAMPLES 1-8

Examples 1–4 and 6–8 are outside the scope of this invention. Example 1 is a control example, wherein a commercial, low cost, melt adhesive containing no oil extender was tested. Examples 7 and 8 provide data for oil-extending compositions based on ethylene/vinyl acetate (E/VAc) copolymers. Examples 2 and 3 provide compositions and test results for compositions based on ethylene/methacrylic acid (E/MAA) copolymers of the type suitable in this invention but containing higher levels of oil. The compositions of Examples 4 and 6 have too high melt viscosity. Finally, Example 5 is entirely within the scope of this invention. The results are given below in Table I.

TABLE I

| Composition (%) and melt index | Example 1 | 2 | 3 | 4 | 5 | 6 | 7 | 8 |
|---|---|---|---|---|---|---|---|---|
| Commercial adh. | 100 | | | | | | | |
| E/MAA (89/11), 100 | | 34 | | | | | | |
| E/MAA (89/11), 100 | | | 45 | | | 40 | | |
| E/MAA (89/11), 100 | | | | 50 | | | 40 | |
| E/MAA (89/11), 100 | | | | | 40 | | | 40 |
| Stabilized tall oil rosin[1] | | 33 | 35 | 40 | 50 | 50 | 50 | 50 |
| Hydrocarbon oil[2] | | 33 | 20 | 10 | 10 | 10 | 10 | 10 |
| Oil exudation | — | Heavy | Mod. | None | None | None | None | None |
| Viscosity, kPa · s at | | | | | | | | |
| 121° C. | 11100 | 8700 | 32600 | 68000 | 22900 | 29900 | 14600 | 157500 |
| 135° C. | 6700 | 5100 | 18200 | 35000 | 14200 | 26000 | 8400 | 113000 |
| 149° C. | 4500 | 3100 | 10600 | 19000 | 7900 | 15700 | 5100 | 70500 |
| 163° C. | 3100 | 1900 | 6300 | 11100 | 4700 | 8900 | 3300 | 44000 |
| 177° C. | 2200 | 1350 | 3900 | 7100 | 2900 | 5700 | 2200 | 27600 |
| Softening point °C. ring and ball | 99 | — | 91 | 94 | 91 | 92 | — | — |
| Tensile strength, kPa | 3866 | — | 1323 | 4123 | 3040 | 3861 | 717 | 4254 |
| Elongation, % | 74 | — | 67 | 560 | 665 | 628 | 606 | 1103 |
| Peel strength, kPa heat sealed at 121° C.[3] | 14.5 | — | 13.1 | 7.6 | 15.2 | 17.2 | 31.7 | — |
| heat sealed at 149° C.[4] | 11.7 | — | 12.4 | 9.7 | 16.5 | 13.8 | 35.2 | — |

[1] Crosby® 721, Crosby Chemicals, Inc.
[2] Circosol® 4240, Sun Oil Co.
[3] sealed at 138 kPa pressure, dwell time 4 sec.
[4] sealed at 138 kPa pressure, dwell time 2 sec.

These examples show that at the level of 10% of hydrocarbon oil (Examples 4–8), no exudation was observed; that certain compositions did not have the right melt viscosity at 177° C. (Examples 4, 6 and 8); and that copolymers of ethylene with vinyl acetate were not suitable in oil-extended melt adhesive compositions, either because of high melt viscosity (Example 8) or because of poor tensile strength (Example 7). The compositions of Examples 4 and 6, although having correct proportions of all the components, had an impractically high viscosity. A higher melt index polymer probably would give good melt adhesive compositions.

EXAMPLES 9-11

Three different compositions were compared. The results are given below in Table II. The copolymer was an E/MAA 85/15 copolymer having a melt index of 101.

TABLE II

| Composition % | Example 9 | Example 10 | Example 11 |
|---|---|---|---|
| Copolymer | 40 | 40 | 40 |
| Stabilized tall oil rosin[1] | 50 | 47.5 | 45 |
| extending oil[2] | 10 | 12.5 | 15 |
| Oil exudation | none | none | slight |
| Viscosity, kPa . s at | | | |
| 121° C. | 32500 | 25300 | 24700 |
| 135° C. | 16200 | 12800 | 13100 |
| 149° C. | 8400 | 7200 | 7000 |
| 163° C. | 5000 | 4000 | 4000 |
| 177° C. | 2700 | 2300 | 2200 |

[1] Crosby® 721
[2] Circosol® 4240

It can be seen that all these compositions have good melt viscosity, but the composition of Example 11 is unsuitable because of slight oil exudation.

EXAMPLES 12–14

These examples compare the properties of adhesive compositions based on E/MAA copolymers having different monomer proportions and melt indices with the control commercial adhesive of Example 1. The results are given in Table III. The same rosin and oil were used as in the preceding examples.

The above data show that even for equal monomer makeup, copolymers having different melt indices will give different results; but it is possible to predict the direction of change and accordingly select the proper copolymer in the right proportion to achieve the desired result.

EXAMPLES 15–21

These examples compare different formulations of melt adhesive compositions using various types of tall oil rosins and different extending oils. The copolymer was in all cases an E/MAA 95/5 copolymer having a melt index of 196. The adhesive composition was in all cases a blend of copolymer/tall oil rosin/hydrocarbon oil in the respective proportions of 40/50/10. The results are given in Table IV.

TABLE III

| Example | Composition % | Copolymer MAA % | Copolymer Melt Index | Viscosity, kPa . s at 177° C. | Soft. Point °C. | Tensile strength kPa | Elongation, % |
|---|---|---|---|---|---|---|---|
| 12 | Commercial adhesive | — | — | 2400 | 98.3 | 5406 | 47 |
| 13 | Copolymer/rosin/oil 50/40/10 | 10 | 91 | 6400 | 95.6 | 5102 | 590 |
| | Copolymer/rosin/oil 50/40/10 | 10 | 140 | 4600 | 96.7 | 3999 | 460 |
| | Copolymer/rosin/oil 50/40/10 | 10 | 199 | 5000 | 97.8 | 3999 | 580 |
| | Copolymer/rosin/oil 50/40/10 | 10 | 453 | 1800 | 97.2 | 3034 | 230 |
| | Copolymer/rosin/oil 50/40/10 | 5 | 107 | 5800 | 103.3 | 3793 | 410 |
| | Copolymer/rosin/oil 50/40/10 | 5 | 195 | 4200 | 102.2 | 3930 | 180 |
| | Copolymer/rosin/oil 50/40/10 | 5 | 453 | 2200 | 101.1 | 4274 | 100 |
| 14 | Copolymer/resin/oil 40/50/10 | 10 | 91 | 3900 | 93.3 | 3585 | 620 |
| | Copolymer/resin/oil 40/50/10 | 10 | 199 | 2400 | 98.9 | 3103 | 270 |
| | Copolymer/resin/oil 40/50/10 | 10 | 453 | 900 | 96.7 | 2275 | 390 |
| | Copolymer/resin/oil 40/50/10 | 5 | 107 | 2900 | 101.7 | 3585 | 350 |
| | Copolymer/resin/oil 40/50/10 | 5 | 195 | 2000 | 102.8 | 2896 | 360 |
| | Copolymer/resin/oil 40/50/10 | 5 | 453 | 1500 | 104.4 | 4137 | 150 |

TABLE IV

| Composition | 15 | 16 | 17 | 18 | 19 | 20 | 21 |
|---|---|---|---|---|---|---|---|
| Tall oil rosin | Stabilized[1] | Stabilized[1] | Stabilized[1] | Modified[2] | Unmodified[3] | Unmodified[4] | Disproportionated[5] |
| Hydrocarbon oil | Circosol® 4240[6] | Sunthene® 410[6] | Flexon® 765[7] | Sunthene® 410[6] | Sunthene® 410[6] | Sunthene® 410[6] | Sunthene® 410[6] |
| Viscosity, kPa . s at | | | | | | | |
| 121° C. | 18000 | 16000 | 12000 | 17500 | 14300 | 13300 | 16000 |
| 149° C. | 5600 | 5300 | 3300 | 4800 | 5000 | 4600 | 6000 |
| 177° C. | 1850 | 2200 | 2000 | 2000 | 2050 | 1900 | 2500 |
| After 100 hrs at 177° C. | 2400 | — | 1000 | 2200 | 1900 | 1800 | — |
| Soft. Point, ring & ball | 93.3° C. | 100° C. | 100° C. | 99.4° C. | 99.4° C. | 99.4° C. | 100° C. |
| Tensile strength, kPa | 3999 | 2937 | 2827 | 2758 | 2330 | 3151 | 2160 |
| Elongation, % | 540 | 242 | 264 | 174 | 160 | 571 | 193 |

TABLE IV-continued

| | Example | | | | | | |
|---|---|---|---|---|---|---|---|
| Composition | 15 | 16 | 17 | 18 | 19 | 20 | 21 |
| Tall oil rosin | Stabilized[1] | Stabilized[1] | Stabilized[1] | Modified[2] | Unmodified[3] | Unmodified[4] | Disproportionated[5] |
| Hydrocarbon oil | Circosol® 4240[6] | Sunthene® 410[6] | Flexon® 765[7] | Sunthene® 410[6] | Sunthene® 410[6] | Sunthene® 410[6] | Sunthene® 410[6] |
| Shore D hardness | 95 | 92 | 89 | 86 | 86 | 87 | 78 |

[1]Crosby® 721, Crosby Chemicals, Inc.
[2]Sylvatac® RX, Sylvachem Corporation
[3]Acintol® RS, Arizona Chemical Co.
[4]Acintol® R3A, Arizona Chemical Co.
[5]Nilox® STOR-588-41-1, Reichhold Chemical Co.
[6]Sun Co.
[7]Exxon Corp.

It is of interest to note that all the above tall oil rosins and two hydrocarbon oils have been approved by the Food and Drug Administration for use in sealing food-containing cartons.

EXAMPLES 22–27

These examples compare the physical and adhesive properties of several compositions of this invention. In all cases, the base copolymer was an ethylene/acrylic acid copolymer. The tall oil was an unmodified commercial grade, and the hydrocarbon oil was Flexon® 760 (Exxon Corp.). The data are tabulated below.

substituting for the original antioxidant (2,6-di-tert-butyl-4-methylphenol) 0.5%, based on the weight of all the other components, of either tri(nonylphenyl) phosphite or a mixture of equal amounts of Irganox® 1010 and Weston® 618. When the composition of Example 25 was modified in this manner, the original 177° C. viscosity changed from 2000 to 2100 kPa·s in the former case and from 1800 to 2200 kPa·s in the latter case.

EXAMPLES 28–34

Adhesive compositions based on a copolymer of ethylene with methacrylic acid were prepared with the

TABLE V

| | Example | | | | | |
|---|---|---|---|---|---|---|
| Composition | 22 | 23 | 24 | 25 | 26 | 27 |
| Copolymer | | | | | | |
| Acryl. Acid, % | 10 | 10 | 15 | 5 | 10 | 15 |
| Melt Index | 120 | 230 | 105 | 300 | 230 | 180 |
| Adhesive Comp. | Copolymer | 40 | 40 | | | |
| 40 | | | | 42 | 42 | 42 |
| Tall Oil Rosin | 55 | 55 | 55 | 53 | 53 | 53 |
| Hydrocarbon Oil | 5 | 5 | 5 | 5 | 5 | 5 |
| Viscosity at | | | | | | |
| 177° C., kPa·s | 3250 | 2300 | 3400 | 2000 | 3000 | 3700 |
| After 100 hrs | | | | | | |
| at 177° C. | 7700 | 4800 | 8800 | 3000 | 4000 | 7000 |
| Tensile | | | | | | |
| strength, kPa | 5116 | 4420 | 3799 | 3206 | 3551 | 3489 |
| Elongation, % | 475 | 497 | 431 | 380 | 521 | 525 |
| Elastic modulus, MPa | 103.4 | 114.5 | 18.6 | 77.2 | 44.8 | 20 |
| Lap shear fail temp. °C. (programmed oven) | 85 | 84 | 69 | 95 | 83 | 63 |
| Run temp. creep. time to failure | 10 days 1.25 cm creep. | over 2 wks No creep. | over 2 wks | 30.5 hrs | over 2 wks 1.25 cm creep. | over 2 wks No creep. |
| Low temp. adhesion −32° C. | Fiber Tear | Fiber Tear | Fiber Tear | Fiber Tear | Fiber Tear | Fiber Tear |

It can be seen that only the compositions of Examples 25 and 26 maintained their 177° C. viscosities within the 1000–4000 kPa·s range after a 100 hr heat cycle. However, the absolute values of these viscosities increased considerably. This problem, which did not occur with E/MAA copolymers, could, however, be corrected by same tall oil rosin and process oil as in Examples 21–26 and compared in the same manner. The results are shown in Table VI, below. The standard antioxidant, 2,6-di-tert-butyl-4-methylphenol, was used in all compositions.

TABLE VI

| | Example | | | | | | |
|---|---|---|---|---|---|---|---|
| Composition | 28 | 29 | 30 | 31 | 32 | 33 | 34 |
| Copolymer | | | | | | | |
| MAA % | 11 | 11 | 12 | 12 | 5 | 11.4 | 11.2 |
| Melt Index | 100 | 100 | 209 | 209 | 197 | 128 | 209 |
| Adhesive Comp. | | | | | | | |
| Copolymer/ Rosin/Oil | 40/53/7 | 40/54/6 | 40/55/5 | 40/55/5 | 40/55/5 | 40/55/5 | 40/55/5 |

TABLE VI-continued

| Composition | Example 28 | 29 | 30 | 31 | 32 | 33 | 34 |
|---|---|---|---|---|---|---|---|
| Viscosity at 177° C., kPa·s | 3900 | 3000 | 1800 | 1900 | — | 2550 | 1500 |
| After 100 hrs at 177° C. | — | 2440 | 1950 | 2050 | — | 2775 | 1525 |
| Adhesion properties | | | | | | | |
| Lap shear fail temp. °C. (programmed oven) | 83° C. | 83° C. | 83° C. | 85° C. | — | 85° C. | 86° C. |
| Low temp. adhesion 24 hr at −28.9° C. | Fiber Tear | Fiber Tear | Cohesive Failure | Fiber Tear | Cohesive Failure | Fiber Tear | Fiber Tear |
| Room temp. creep time to failure | over 990 | 25 | over 36 | over 61 | 57 | over 142 | 18 |
| Tensile strength, kPa | 3048 | 4358 | 3551 | 3482 | 3110 | 3558 | 3192 |
| Elongation, % | 700 | 614 | 564 | 577 | 585 | 587 | 607 |
| Elastic modulus, MPa | 14.1 | 28.9 | 31 | 26.2 | 42.3 | 23.8 | 10.9 |
| Softening point, °C. | 91.1 | 92.2 | 90 | 90.6 | — | 91.7 | 88.9 |

All the above compositions had good adhesive, rheological, and physical properties.

We claim:

1. A wax-free adhesive composition having an initial 177° C. melt viscosity of about 1000–4000 kPa·s and consisting essentially of the following components:
   (1) about 20–50 parts of a copolymer of a $C_2$–$C_{10}$ α-olefin with an aliphatic, ethylenically unsaturated carboxylic acid or with maleic anhydride, which copolymer may also contain another ethylenically unsaturated comonomer selected from the group consisting of carboxylic acids and carboxylic acid esters;
   (2) about 30–60 parts of a tall oil rosin; and
   (3) about 1–13 parts of a hydrocarbon oil; all the above parts being by weight, and their sum being 100; said adhesive composition also containing a minor amount of an antioxidant capable of stabilizing it against viscosity deterioration and substantial discoloration on heating.

2. A composition of claim 1 wherein the amount of Component (1) is about 30–50 parts; the amount of Component (2) is about 40–60 parts; and the amount of Component (3) is about 3–7 parts.

3. A composition of claim 2 wherein the tall oil rosin is heat treated tall oil rosin.

4. A composition of claim 1 wherein the α-olefin content of Component (1) is 80–99 weight percent.

5. A composition of claim 4 wherein the α-olefin content of Component (1) is 85–95 weight percent.

6. A composition of claim 5 wherein the α-olefin content of Component (1) is 90–95 weight percent.

7. A compositin of claim 4 wherein the α-olefin is ethylene.

8. A composition of claim 7 wherein Component (1) is a copolymer of ethylene with an α,β-unsaturated carboxylic acid.

9. A composition of claim 8 wherein the α,β-unsaturated carboxylic acid is represented by the formula

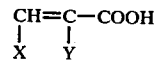

where X is $H_1$, COOH, or COOR, R being a hydrocarbon radical; and Y is H or $CH_3$.

10. A composition of claim 9 wherein the α,β-unsaturated carboxylic acid is methacrylic acid.

11. A composition of claim 4 wherein the α-olefin is ethylene plus at least one other α-olefin, the total proportion of the other α-olefins being at most about 20 weight percent of the total α-olefin content of the copolymer.

12. A composition of claim 1 wherein the amount of antioxidant is less than 1% of the combined weight of Components (1), (2), and (3).

13. A composition of claim 12 wherein the antioxidant is selected from hindered phenols, organic phosphites, and mixtures thereof.

* * * * *